United States Patent
Sasaki et al.

[19]

[11] Patent Number: 6,154,338
[45] Date of Patent: *Nov. 28, 2000

[54] RECORDING/REPRODUCING APPARATUS

[75] Inventors: Shinkichi Sasaki; Harutaka Sekiya, both of Fukushima-ken, Japan

[73] Assignee: Alps Electric Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,237

[22] Filed: Apr. 28, 1997

[30] Foreign Application Priority Data

Feb. 5, 1996 [JP] Japan .................................. 8-111423

[51] Int. Cl.[7] .......................... G11B 17/04; G11B 15/00; G11B 23/02
[52] U.S. Cl. .......................... 360/99.06; 360/94; 360/132
[58] Field of Search .............................. 360/99.06, 99.02, 360/133, 96.5, 132, 96.1, 94; 369/77.2, 77.1, 75.2, 75.1

[56] References Cited

U.S. PATENT DOCUMENTS

| | | | |
|---|---|---|---|
| 4,864,439 | 9/1989 | Duurland | 360/132 |
| 5,062,100 | 10/1991 | Verhoeven et al. | 360/133 |
| 5,063,554 | 11/1991 | Uehara | 360/99.06 |
| 5,325,243 | 6/1994 | Rath et al. | 360/99.06 |
| 5,351,228 | 9/1994 | Kanno et al. | 360/99.06 |
| 5,495,586 | 2/1996 | Adachi et al. | 369/75.1 |
| 5,502,704 | 3/1996 | Ohmori | 369/77.2 |
| 5,689,490 | 11/1997 | Pollard | 369/77.2 |
| 5,706,146 | 1/1998 | Ono et al. | 360/132 |

FOREIGN PATENT DOCUMENTS 2-92845   7/1990   Japan .

*Primary Examiner*—Allen T. Cao
*Attorney, Agent, or Firm*—Brinks Hofer Gilson & Lione

[57] ABSTRACT

On the upper surface of a cartridge case 4, there are formed a pair of press protrusions 4a situated on both sides thereof, a recess 4b situated between the two press protrusions 4a, first and second swelled portions 4c and 4d situated at the front and rear ends of the recess 4b of the cartridge case 4 and stopper protrusions 4e formed so as to continuously extend from both sides of the rear end of the second swelled portion 4d, the configurations of the front and rear end surfaces with respect to the direction in which the disc cartridge 3 is inserted being different from each other. On a front plate 1 having an opening 2 into which this disc cartridge 3 is to be inserted, there are formed a pair of protrusions 1a protruding downwards from the upper side of the opening 2 and a pair of reverse insertion preventing sections 1b situated on the inner side of these protrusions 1a, wherein the contour of the protrusions 1a substantially coincides with the configuration of the recess 4b at the rear end surface of the cartridge case 4, and wherein the contour of the protrusions 1a and the reverse insertion preventing sections 1b put together substantially coincides with the configuration of the recess 4b at the front end surface of the cartridge case 4.

2 Claims, 6 Drawing Sheets

FIG. I

RECORDING/REPRODUCING APPARATUS

BACKGROUND OF THE INVENTION

1. Field of the Invention

The present invention relates to a recording/reproducing apparatus of the type in which a cartridge containing a recording medium, such as a magnetic disc, is inserted into the apparatus to perform recording/reproduction and, in particular, to a reverse-insertion preventing mechanism for controlling the cartridge inserting direction.

2. Description of the Related Art

In a magnetic recording/reproducing apparatus which records/reproduces information on/from, for example, a magnetic disc contained in a disc cartridge, the disc cartridge is inserted through an opening on the front side of the apparatus, whereby information is recorded/reproduced on/from the magnetic disc by means of a magnetic head that is arranged in the apparatus.

In such a known magnetic recording/reproducing apparatus, a rectangular opening is formed on the front side of the apparatus, and a holder that is arranged inside the apparatus is provided with a lock mechanism for preventing the disc cartridge from being reversely inserted. This lock mechanism consists, for example, of a cutout formed on the holder and a wire spring having a hook-shaped bent section, the bent section being capable of moving within the cutout. The disc cartridge used in this magnetic recording/reproducing apparatus has a quadrangular configuration in plan view and a tapered gullet section formed in a corner of the front end surface thereof. When this disc cartridge is correctly inserted into the opening starting with the front end surface thereof, the bent section of the wire spring is detached from the cutout by the gullet section of the disc cartridge in the course of insertion. When the disc cartridge is further inserted into the opening, the disc cartridge is conveyed to a loading position as it is held by the holder. When the disc cartridge is erroneously inserted into the opening starting with the wrong end thereof, the bent section of the wire spring abuts the rear end surface of the disc cartridge, whereby the disc cartridge is prevented by the lock mechanism from being further inserted.

However, in the above-described conventional magnetic recording/reproducing apparatus, it is necessary to provide a complicated lock mechanism consisting of a wire spring, a cutout, etc. in the apparatus, which means a complicated mechanism is required, resulting in a rather high cost. Further, if the disc cartridge is erroneously inserted into the opening starting with the wrong end thereof, the disc cartridge can be inserted to some degree into the opening, so that there is a concern that the mechanism including the lock mechanism, etc. will be damaged by further pushing in the disc cartridge.

SUMMARY OF THE INVENTION

In accordance with the present invention, there is provided a recording/reproducing apparatus of the type in which a cartridge is inserted into the apparatus through an opening to thereby perform recording/reproduction on/from a recording medium that is accommodated in the above-mentioned cartridge, wherein the respective configurations of the front and rear end surfaces with respect to the inserting direction of said cartridge are different from each other, whereby a reverse insertion preventing mechanism is formed which allows the above-mentioned cartridge to be inserted into the opening starting with its front end surface and which prevents the above-mentioned cartridge from being inserted into the opening starting with its rear end surface.

The configuration of the above-mentioned opening is such that it allows the above-mentioned cartridge to be only inserted starting with its front end surface. When the configuration of this opening is substantially the same as that of the front end surface of the cartridge, it is possible to minimize the gap between the opening and the cartridge when the cartridge is inserted.

Further, when a recess extending in the inserting direction is formed on the cartridge, and a stopper protrusion capable of abutting the above-mentioned reverse insertion preventing mechanism is formed on the rear end surface of the cartridge with respect to the cartridge inserting direction, the reverse insertion preventing mechanism also functions as a stopper for controlling the insertion amount of the cartridge.

Further, when a protrusion which is adjacent to the above-mentioned reverse insertion preventing mechanism is formed in the above-mentioned opening so that the above-mentioned recess is closed by the above-mentioned protrusion when the cartridge is inserted into the opening, it is possible to close the opening completely with the rear end surface of the cartridge and the protrusion when the cartridge is inserted.

Further, when the above-mentioned protrusion protrudes in the cartridge discharging direction with respect to the above-mentioned reverse insertion preventing section, the open face of the opening can be made flush with the rear end surface of the cartridge when the cartridge is inserted.

DESCRIPTION OF THE PREFERRED EMBODIMENTS

An embodiment of the present invention will be described with reference to the drawings.

Figure 1:
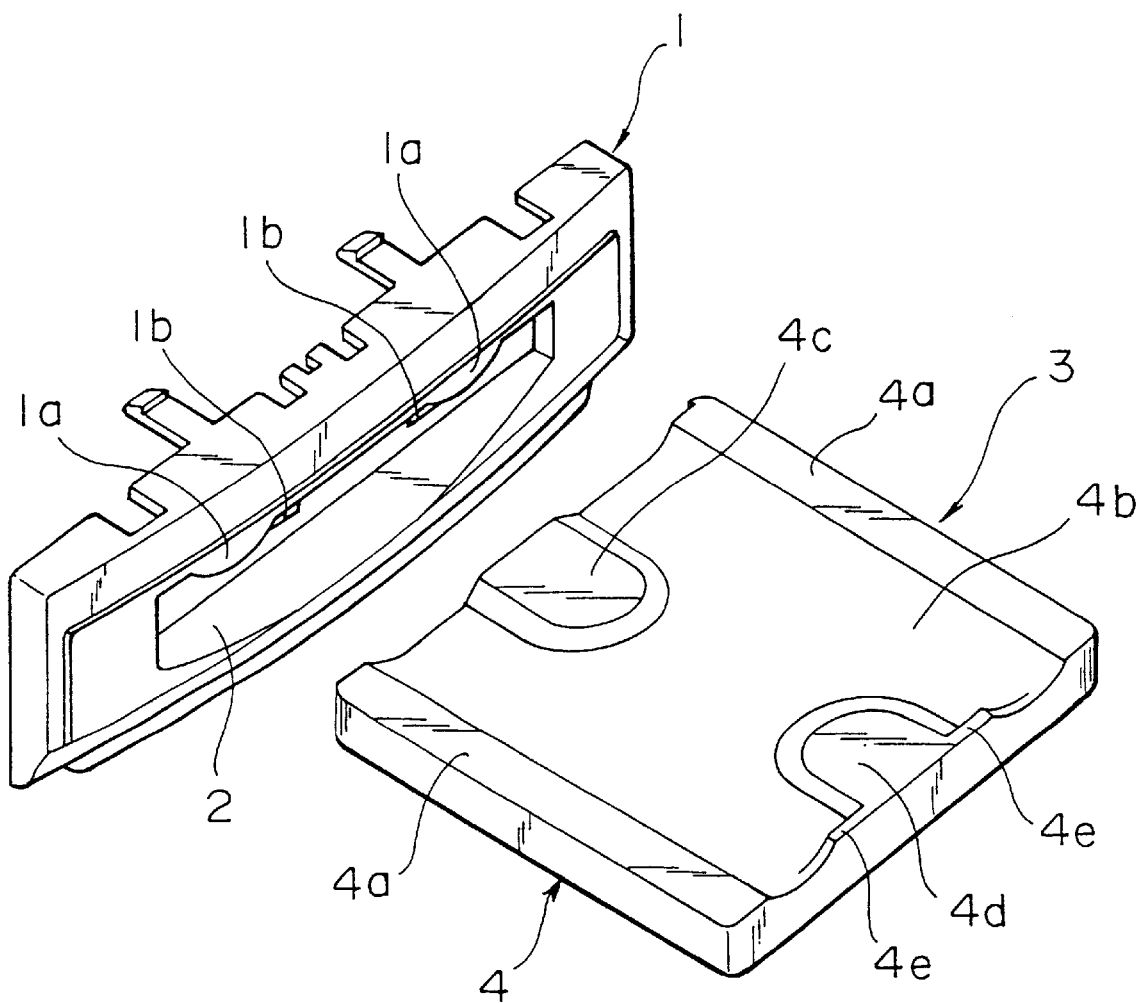
FIG. 1 is a perspective view showing the essential part of a magnetic recording/reproducing apparatus according to an embodiment of the present invention.

As shown in FIG. 1, a front plate 1 having an opening 2 is attached to a magnetic recording/reproducing apparatus. A disc cartridge 3 is inserted into the interior of the magnetic recording/reproducing apparatus through this opening 2. As shown in FIGS. 2 through 5, the disc cartridge 3 is composed of a cartridge case 4 that is formed by integrally joining upper and lower cases of a hard synthetic resin to each other, a magnetic disc 5 rotatably accommodated in this cartridge case 4, and a shutter 6 extending from the front to the lower side of the cartridge case 4 so as to be capable of reciprocating. The shutter 6 is biased in one direction by a spring (not shown). The lower side of the cartridge case 4 is flat, while the upper side thereof has protrusions and recesses. That is, on both sides of the upper surface of the cartridge case 4, there are formed a pair of press protrusions 4a, between which there is formed a recess 4b. In this recess 4b, there are formed first and second swelled portions 4c and 4d situated in the front and rear sections of the cartridge case 4. A through-hole 7 extends from that portion of the lower surface of the cartridge case 4 which is situated directly below the first swelled portion 4c to the front end surface of the cartridge case. The two swelled portions 4c and 4d are arranged in the same line and have the same width. However, stopper protrusions 4e are formed on both sides of the rear end of the second swelled portion 4d. These stopper protrusions 4e continuously extend from the bottom surface of the recess 4b to the upper surface of the second swelled portion 4d. Thus, as shown in FIG. 3, while the front end surface of the cartridge case 4 shows a pair of portions of the recess 4b having a relatively large width, the rear end surface of the cartridge case 4 shows a pair of portions of the recess 4b having a relatively small width. Thus, the front and rear end surfaces with respect to the inserting direction of the disc cartridge 3 (the direction indicated by the arrow A of FIG. 2) have different configurations.

Figure 6:
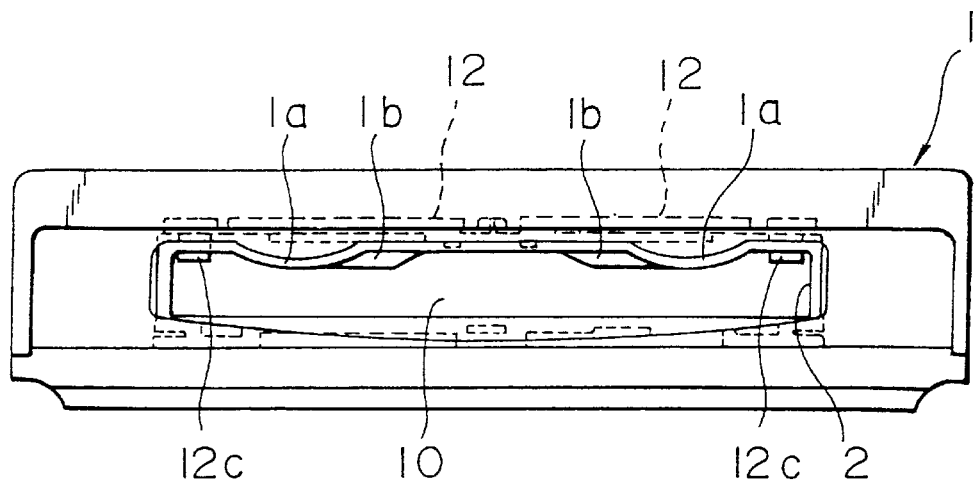
FIG. 6 is a front view of a front plate of FIG. 1.

As shown in FIGS. 1 and 6, in the front plate 1, there are formed a pair of protrusions 1a protruding downwards from the upper side of the opening 2 and a pair of reverse insertion preventing sections 1b situated on the inner side of these protrusions 1a. The protrusions 1a are substantially flush with the open end face of the opening 2, whereas the reverse insertion preventing sections 1b are recessed inwardly from the opening 2, so that there is a step between them. Further, when seen from the front side of the opening 2, the contour of the protrusions 1a substantially coincides with the configuration of the recess 4b at the rear end surface of the cartridge case 4 (See FIG. 4), whereas the contour of the protrusions 1a and the reverse insertion preventing sections 1b put together substantially coincides with the configuration of the recess 4b at the front end surface of the cartridge case 4 (See FIG. 3).

Figure 7:
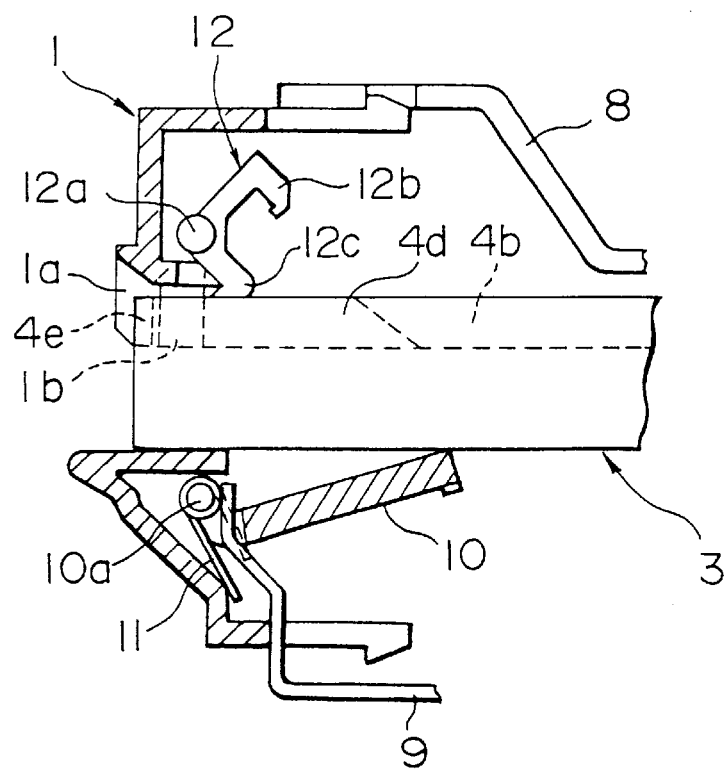
FIG. 7 is a sectional view showing how the disc cartridge is loaded.
Figure 8:
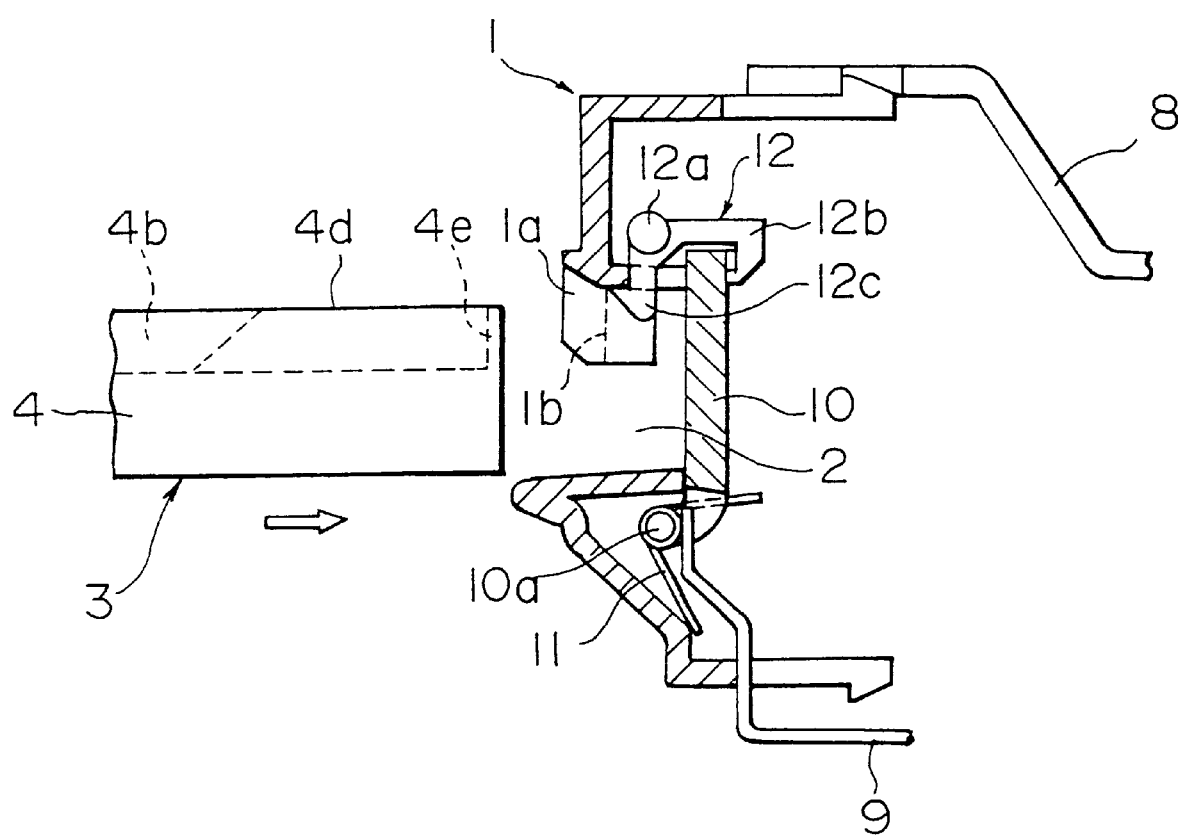
FIG. 8 is a sectional view showing the disc cartridge in the reversely inserted state.

As shown in FIGS. 7 and 8, the front plate 1 is snapped onto a holder 8, a chassis 9, etc. that are arranged inside the magnetic recording/reproducing apparatus, and a plate-like door 10 is rotatably supported on the back side of the front plate 1. A torsion coil spring 11 is wound around a rotation shaft 10a of this door 10, and the door 10 is biased so as to close the opening 2 by the elasticity of the torsion coil spring 11. Further, on the back side of the front plate 1, a pair of lock members 12 are rotatably supported. Each of these lock members 12 has a support shaft 12a supported on the back side of the front plate 1, a lock section 12b that is integrally formed with the support shaft 12a and a press section 12c. By the elasticity of a coil spring (not shown), the lock sections 12b are biased so as to be engaged with the upper end of the door 10, and, in this condition, the press sections 12c are exposed in the opening 2 and situated in the vicinity of the protrusions 1a.

In this magnetic recording/reproducing apparatus, constructed as described above, the opening 2 is closed with the door 10 when the disc cartridge 3 is not loaded into the magnetic recording/reproducing apparatus, and the door 10 is prevented from freely rotating by the lock members 12. Thus, if the door 10 is pressed by something other than the proper disc cartridge 3, the door 10 is prevented from rotating by the lock members 12, whereby it is possible to reliably prevent foreign matter from intruding the interior of the magnetic recording/reproducing apparatus through the opening 2.

Figure 2:
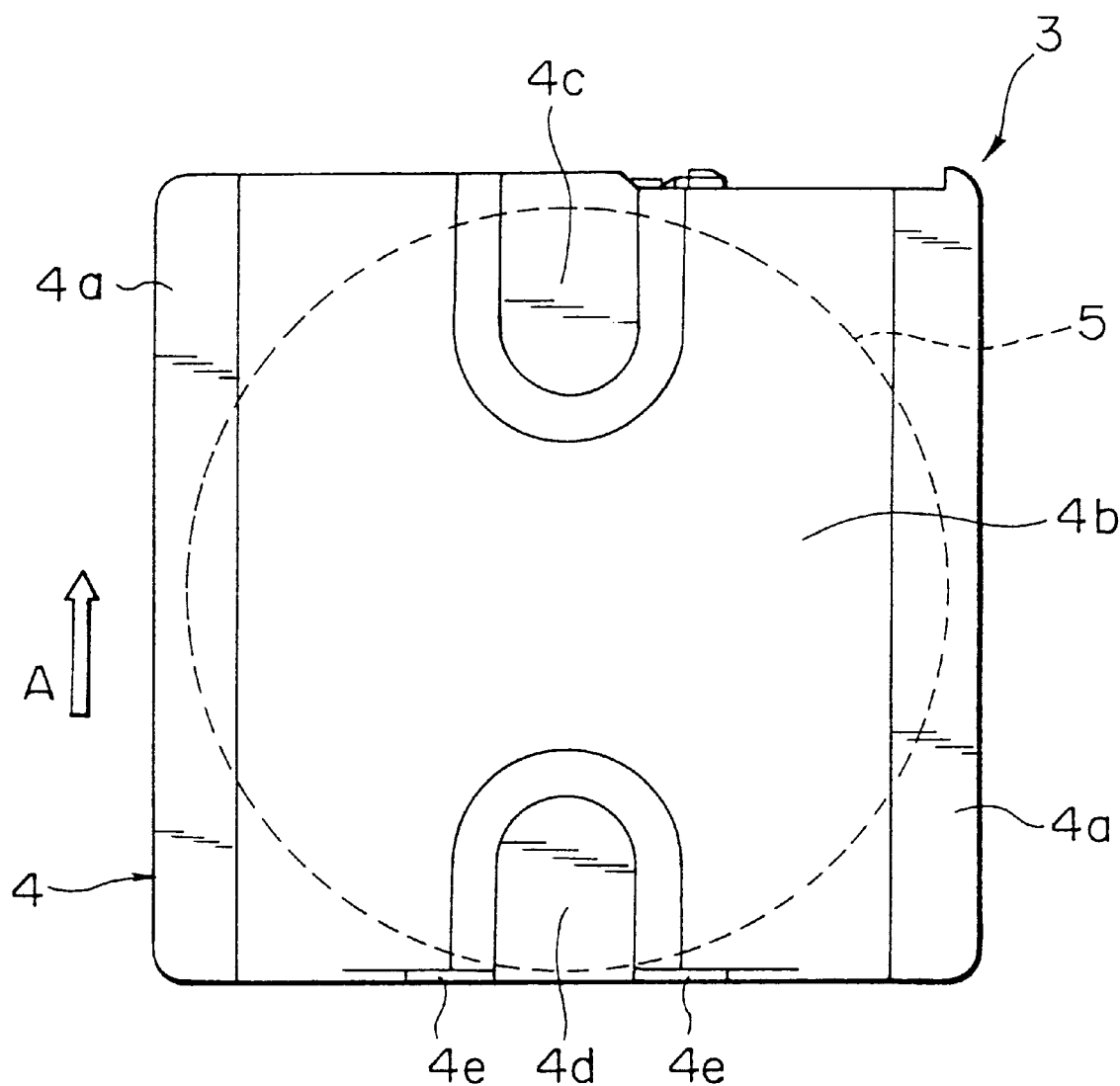
FIG. 2 is a plan view of a disc cartridge used in the magnetic recording/reproducing apparatus.
Figure 3:
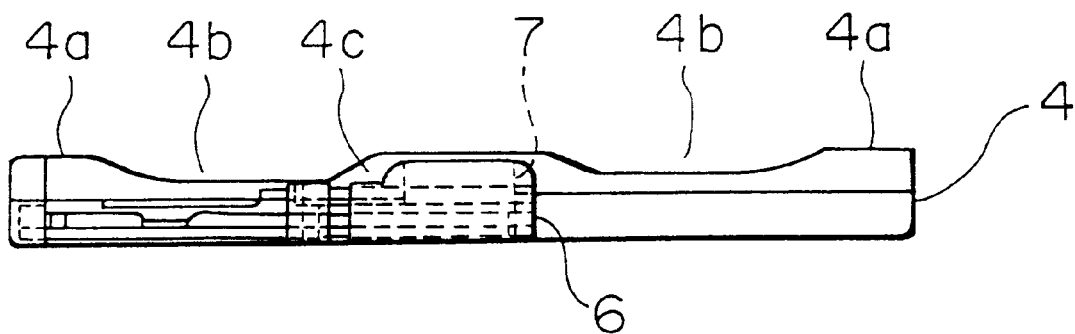
FIG. 3 is a front view of the disc cartridge.
Figure 4:
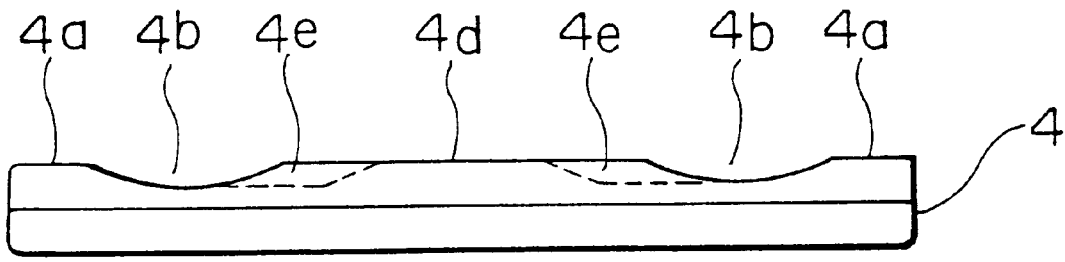
FIG. 4 is a rear view of the disc cartridge.
Figure 5:
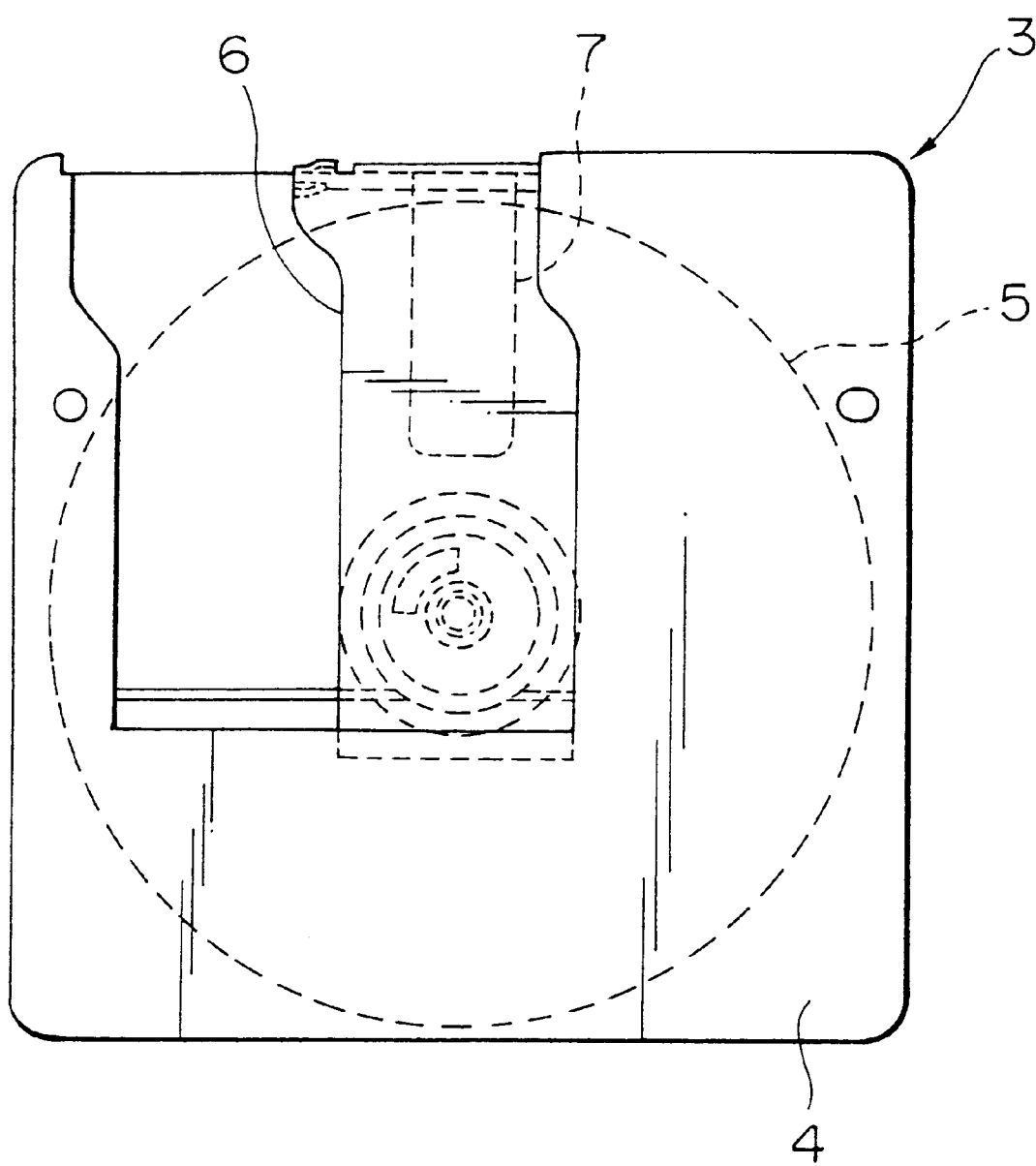
FIG. 5 is a bottom view of the disc cartridge.

When using the apparatus, the disc cartridge 3 is inserted into the opening 2 in the direction indicated by the arrow A of FIG. 2. When the disc cartridge is correctly inserted, the front end surface of the disc cartridge 3 is inserted into the opening 2 without abutting the protrusions 1a and the reverse insertion preventing sections 1b. When the disc cartridge 3 is thus inserted into the opening 2, the press sections 12c exposed on both ends of the upper side of the opening 2 are pressed by the press protrusions 4a of the disc cartridge 3, with the result that the lock members 12 rotate on the support shafts 12a, whereby the engagement of the lock sections 12b with the door 10 is cancelled. When the disc cartridge 3 is further pushed in to be pressed against the door 10, the door 10 rotates on the rotation shaft 10a, as shown in FIG. 7, and the disc cartridge 3 is inserted to a loading position as it is held by the holder 8 inside the magnetic recording/reproducing apparatus. At this loading position, the shutter 6 is driven by a shutter opening/closing mechanism (not shown) to open the through-hole 7, and a magnetic head (not shown) in the magnetic recording/reproducing apparatus enters the first swelled portion 4c to hold the magnetic disc 5, whereby information is recorded/reproduced on/from the magnetic disc 5. Further, at this loading position, the stopper protrusions 4e at the rear end of the disc cartridge 3 abut the reverse insertion preventing sections 1b, so that further insertion of the disc cartridge is impossible. Since the rear end surface of the cartridge case 4 and the open face of the opening 2 are substantially flush with each other, the opening 2 is completely closed by the rear end surface of the cartridge case 4 and the protrusions 1a, and the intrusion of foreign matter at the time of loading is prevented.

If an attempt is made to reversely insert the disc cartridge 3 into the opening 2 starting with its rear end surface, the stopper protrusions 4e formed on the rear end surface of the cartridge case 4 abut the reverse insertion preventing sections 1b formed on the upper side of the opening 2, so that it is impossible to insert the disc cartridge 3 into the opening 2. Further, if an attempt is made to insert the disc cartridge 3 upside down into the opening, part of the cartridge case 4 abuts the protrusions 1a and the reverse insertion preventing sections 1b, so that it is impossible to insert the disc cartridge 3 into the opening 2.

What is claimed is:

1. A recording/reproducing apparatus of the type in which a cartridge is inserted into the apparatus through an opening formed at a front panel of the apparatus to thereby perform recording/reproduction on/from a recording medium that is accommodated in the cartridge, wherein the cartridge comprises top, top-right side, top-left side, front end, rear end, and flat bottom surfaces, the top-right and top-left side surfaces each comprising a respective press protrusion, a recess being formed in the top surface between the respective press protrusions, and the rear end surface comprising a stopper protrusion at least partially closing the recess along the rear end surface, whereby the rear end surface and the front end surface have different cross-sectional shapes; and wherein the front panel comprises protrusions protruding inward of the opening at positions opposed to the recess in the front end surface of the cartridge such that the opening formed in the front panel is shaped the same as the cross-sectional shape of the front end surface of the cartridge to allow insertion of the front end surface into the opening and such that the opening formed in the front panel is shaped differently from the cross-sectional shape of the rear end surface of the cartridge to prevent insertion of the rear end surface into the opening.

2. A recording/reproducing apparatus of the type in which a cartridge is inserted into the apparatus through an opening formed at a front panel of the apparatus to thereby perform recording/reproduction on/from a recording medium that is accommodated in the cartridge, wherein the cartridge comprises top, top-right side, top-left side, front end, rear end, and flat bottom surfaces, the top-right and top-left side surfaces each comprising a respective press protrusion, a recess being formed in the top surface between the respective press protrusions to have a linear and the same cross-sectional shape extending from the front end surface to the rear end surface, and the rear end surface comprising a stopper protrusion at least partially closing the end surface shape of the recess facing the rear end surface, whereby the rear end surface and the front end surface have different cross-sectional shapes, and wherein the front panel comprises protrusions protruding inward of the opening at positions opposed to the recess in the front end surface of the cartridge such that the opening formed in the front panel is shaped the same as the cross-sectional shape of the front end surface of the cartridge and the protrusions are linearly guided in the recess to allow insertion of the front end surface into the opening and such that the opening formed in the front panel is shaped differently from the cross-sectional shape of the rear end surface of the cartridge to prevent insertion of the rear end surface into the opening by cooperation of the stopper protrusion and the protrusions abutting against each other.

* * * * *